United States Patent [19]

Fish

[11] Patent Number: 5,019,672

[45] Date of Patent: May 28, 1991

[54] ACCESS FLOOR CONSTRUCTION

[75] Inventor: Hugh R. A. Fish, London, England

[73] Assignee: Microfloor Systems Limited, London, England

[21] Appl. No.: 391,598

[22] PCT Filed: Jan. 20, 1988

[86] PCT No.: PCT/GB88/00034

§ 371 Date: Sep. 13, 1989

§ 102(e) Date: Sep. 13, 1989

[87] PCT Pub. No.: WO88/05615

PCT Pub. Date: Jul. 28, 1988

[30] Foreign Application Priority Data

Jan. 20, 1987 [GB] United Kingdom ............... 8701129

[51] Int. Cl.$^5$ ............................................. H02G 3/26
[52] U.S. Cl. ......................................... 174/48; 52/263
[58] Field of Search ................. 174/48, 49; 52/221, 52/263

[56] References Cited

U.S. PATENT DOCUMENTS

| 3,856,981 | 12/1974 | Boundy | 174/48 |
| 4,016,357 | 4/1977 | Abrahamsen | 174/48 |
| 4,278,834 | 7/1981 | Boundy | 174/48 |
| 4,631,879 | 12/1986 | Kobayashi et al. | 52/221 X |

FOREIGN PATENT DOCUMENTS 0125914 11/1984 European Pat. Off. .

Primary Examiner—Leo P. Picard
Assistant Examiner—David A. Tone
Attorney, Agent, or Firm—Biebel & French

[57] ABSTRACT

In an access floor construction, service outlets (7), such as electrical sockets, are connected to a service supply accommodated in the underfloor space (5) by leads (9) extending through openings (8) in the edges of some of the removable panels which form the access floor. The removable panels with such openings can be interchanged with other panels and oriented so as to locate an opening (8) in a position close to a service outlet so as to permit the lead from the outlet to pass conveniently into the underfloor space (5) for connection to the service supply.

5 Claims, 1 Drawing Sheet

ACCESS FLOOR CONSTRUCTION

BACKGROUND OF THE INVENTION

The present invention relates to an elevated or raised access floor construction which is erected on an existing building floor to provide underfloor space for the accommodation of electrical and other services and for the distribution of such services to any position beneath the floor. More particularly, the invention is concerned with the provision of service outlets for an access floor and a novel arrangement of said outlets in which the latter are mounted at desired locations or workstations above floor level and cables or leads from the service outlets extend through the access floor for connection to junction boxes or other connection devices located in the underfloor space.

The installation and connection of electrical supplies, telecommunications and other services is specialist work. The codes of practice for such installations are set by professional institutions or governmental bodies and, with regard to raised office access floors, specify that no electrical appliances, for example, shall be connected to the electrical supply without a visible means of isolation. Also, regulations in relation to telecommunications wiring requires that this be shielded from any electrical cables to avoid interference. The same applies to computer wiring and other data transmission systems.

Typically, a raised access floor is constructed from rectangular or square panels supported, at least at their corners, on pedestals located on an existing building or subfloor. The panels may be made from timber or metal and can be lifted to provide the required access. With such access floors, the principle method of meeting the requirement for visible isolation outlets has been to provide outlet sockets at floor level in boxes set into the floor panels. Each service outlet box may, for example, contain electrical sockets wired through the underfloor space into the main electrical supply for the building. When the access floor is installed, a suitable number of service outlet boxes is distributed throughout the floor area. If the positioning of these boxes does not, at any time, coincide with the requirements of the occupants, then they are either left in position and unused, which can be unsightly and risk being a hazard in a carpeted office floor, or the panels containing the boxes are moved to different positions where they are convenient for use. Although moving the panels is not a major operation, this may not readily be performed by the occupants and will necessitate the presence of a qualified engineer for disconnecting and reconnecting the services. Hence, the present system of service outlets is relatively expensive, lacks flexibility and can leave unused outlet boxes in unsightly and potentially hazardous positions.

SUMMARY OF THE INVENTION

It is an object of the present invention to alleviate the above-mentioned disadvantages of the prior system of visible service outlets for access floors and to provide a novel arrangement whereby service outlets can be installed above access floor level and can be readily moved to another location, or be removed altogether and stored, depending on the requirements of the occupants.

The present invention consists in an access floor construction having an access floor formed from removable panels supported on a subfloor to form an underfloor space accommodating at least one service supply which includes at least one distribution device disposed in the underfloor space, one or more of the removable panels forming the access floor having at least one access slot or other opening in at least one edge thereof, characterized by at least one service outlet disposed above floor level and having at least one associated lead connected to an adjacent distribution device in the underfloor space via one of the access openings, the lead(s) of the service outlet being encased in trunking from the service outlet to the access opening.

The invention is particularly suitable for use with electrical services outlets for access floors. Hence, for large office floors, for example, the electrical service supply may include a plurality of junction boxes distributed throughout the underfloor space, preferably, in a regular array, and floor panels having openings in their edge may be distributed throughout the access floor, whereby to permit electrical leads of a plurality of electrical service outlets mounted above the floor level at spaced locations or workstations to be connected to convenient junctions boxes.

Upon construction of the access floor, one or more electrical service outlets are installed above floor level, for example, on a partition wall or piece of furniture, preparatory to use by an occupant, and the leads are guided through conveniently located openings in the edges of some of the floor panels to be connected to convenient junction boxes. Alternatively or in addition, service outlets having their associated leads already connected to junction boxes may be stored in the underfloor space from which they may be readily withdrawn and then installed at a desired location above floor level by the occupants. In either event, the changing of the position of a service outlet, or its initial installation above floor level, is a simple matter and merely requires guiding a lead through a convenient opening in the edge of a removable floor panel adjacent the required location for the outlet. The panel may be readily lifted and replaced to enable the lead to be fed through the opening. If there is not a sufficiently convenient opening in the access floor, either a panel having an access opening may be reorientated or may be interchanged with another panel so as to dispose an access opening in a suitable position. Regulations permit the length of leads between a junction box and an electrical service outlet to be as much as 3 meters so that, in most instances, the position of an electrical service outlet can be changed, or another service outlet is available for installation, without requiring disconnection of an electrical lead and reconnection to another junction box and, hence, the services of a qualified electrical engineer.

Electrical junction boxes installed in the underfloor space may include electrical socket connectors for receiving electrical plugs on the ends of the service outlet leads so as to facilitate disconnection and reconnection of the leads to the junction boxes.

Until required for use, slots in the access floor panels may be closed by means of suitable grommets or other resilient plugs.

Between a service outlet and the access floor, electrical leads may be encased in trunking for protection purposes. An electrical service outlet unit may also include one or more sockets for telecommunication services, which may be provided through wires of fibre optic leads, and such other leads may extend through the same slot as the electrical lead for connection to the distribution system in the underfloor space. The protective trunking, if provided, may contain all these leads and also be arranged so as to shield the telecommunication leads from the electrical power leads.

BRIEF DESCRIPTION OF THE DRAWINGS

In order that the present invention may be more readily understood, reference will now be made to the accompanying drawings, in which.

DESCRIPTION OF THE PREFERRED EMBODIMENTS

Figure 1:
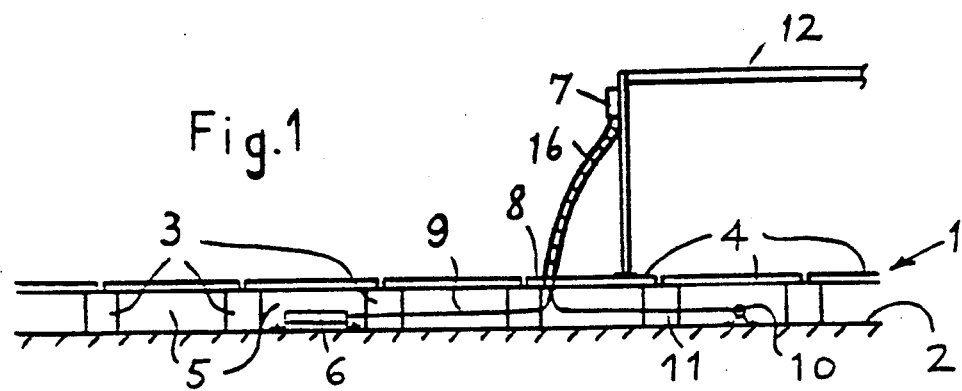
FIG. 1 is a sectional view illustrating an access floor construction embodying the invention.

Referring to the drawings, the raised access floor 1 may be erected on any existing subfloor 2, such as, the structural floor of a building. This access floor may, for example, be constructed as described in our International specification No. WO86/06432. However, whatever the details of construction, as schematically illustrated, access floors typically comprise a regular array of blocks or other pedestals 3 located on the subfloor 2 and load bearing floor panels 4 removable supported on the pedestals to form the access floor. These panels may be rectangular or square, conveniently, 600 mm square and about 30 mm thick, and may be manufactured from wood, steel or concrete. They rest on several of the pedestals 3 with at least their corners resting on four pedestals. The flooring formed from the floor panels may be finished with carpet tiles (not shown).

The access floor is of the "full access" type which means that each floor panel 4 is interchangeable with another. It provides a grid of underfloor passages 5 for accommodating electrical and other services. The electrical supply includes a plurality of junction boxes 6 distributed throughout the underfloor space in a regular array, via which boxes electrical power may be supplied to visible service outlet units 7 disposed above the access floor level. According to the present invention, one or more of the removable panels 4 of the access floor has an access slot or other opening 8 in one of its edges, via which the electrical lead 9 of an electrical service outlet unit 7 disposed above floor level can be connected to an adjacent junction box 6.

About one in thirty of the access floor panels 4 is provided with such a slot 8 and these slots are closed with a temporary rubber or plastic grommets (not shown) until required for use. The floor is of the "full access" type which means that each floor panel is interchangeable with another. Thus, by manipulation of the removable floor panels 4 it is possible to locate an access slot 8 within a few inches of a desk, workstation or whatever position the user requires. A selected panel 4 may be lifted and replaced with one provided with a slot 8 which latter panel can be orientated in steps through 90° to locate the slot in the most appropriate position.

Telecommunication wires are guided through the underfloor space 5 in a main telecommunications duct 10 from which leads 11 may be taken and passed through the same slot 8 in the access panel as an electrical lead to provide telecommunications outlets at or adjacent the electrical service outlets.

Figure 3:
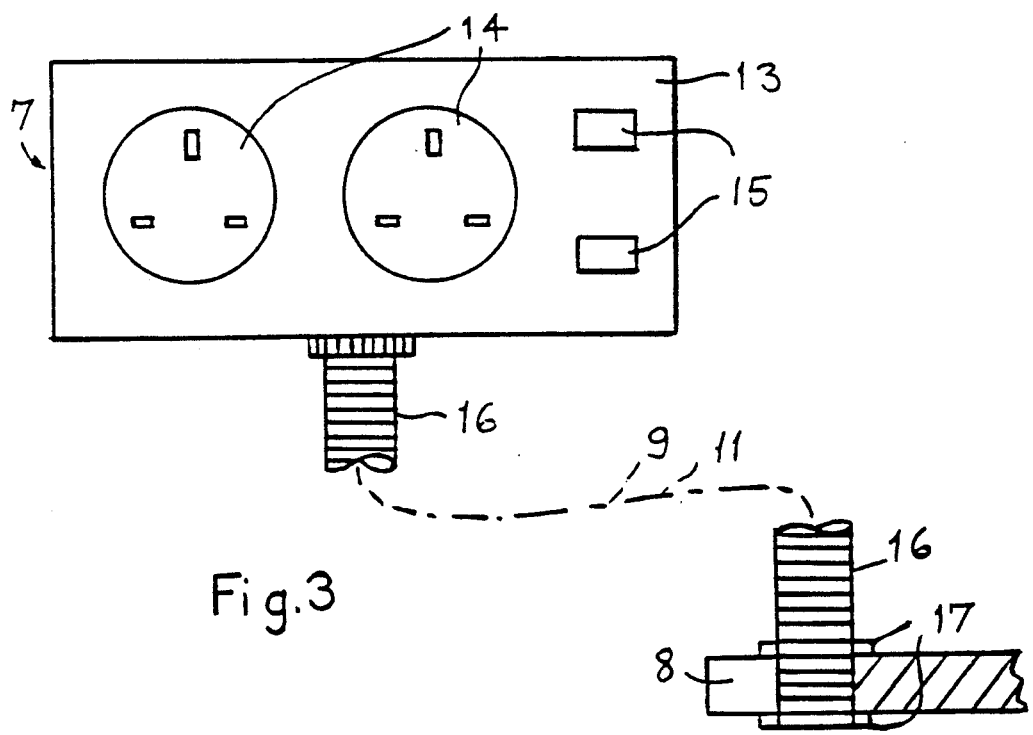
FIG. 3 is a view of the service outlet unit and trunking.
Figure 2:
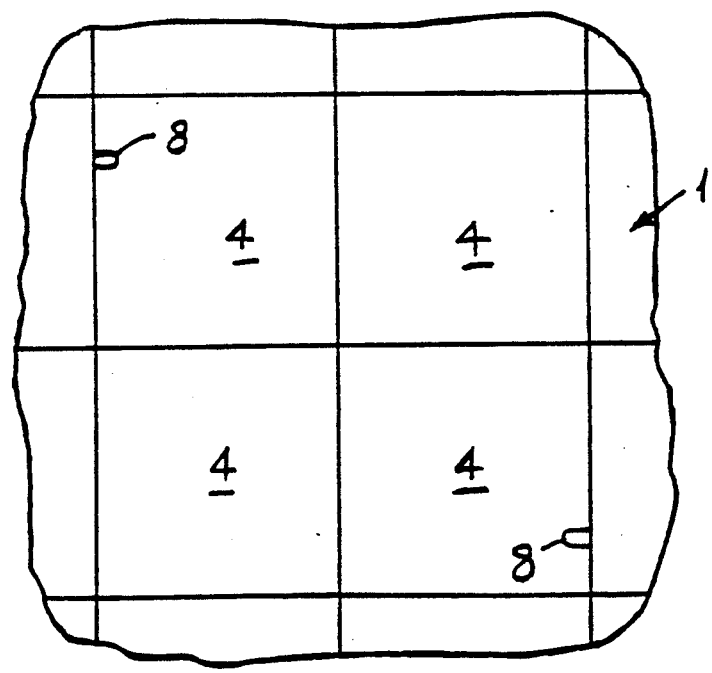
FIG. 2 is a plan view of a fragmentary portion of the floor.

In the embodiment illustrated, the service outlet unit 7 is mounted above floor level by fastening it to the facia of a desk 12. The unit includes a housing 13 (FIG. 3) moulded from plastics material and its size corresponds to that required to hold a variety of outlet sockets. In this embodiment, the unit includes two standard electrical outlet sockets 14 and two telecommunication sockets 15, although another combination of either of such outlet sockets could be used. The housing 13 may have any required shape, colour or texture and the orientation of the sockets is only dependent on aesthetic and practical considerations. For example, the housing can be vertically disposed instead of horizontally, as shown.

The electrical and telecommunication leads 9,11 extend from the bottom of the housing and are encased in a length of trunking 16 fixed to the housing 13 and sufficient to reach easily from desk level to floor level. In certain circumstances, the trunking may be extended to lie within the underfloor space 5 for some further length. The purpose of the trunking is to hold and protect the various leads within it and while passing from the underfloor space to the surface outlet sockets. The lower end of the trunking 16 extends into the associated access slot 8 in the edge of a floor panel 4 and is retained in the slot by means of suitable clips, screws, brackets 17 or the like. The trunking extends through the slot so that it is firmly held against both faces of the panel 4 and the fact that the slot is along an edge of the panel facilitates insertion of the end of the trunking. Upon exiting from the trunking, the leads 9,11 extending into the underfloor space are connected to an adjacent junction box 6 and fed to the main telecommunications duct 10, as appropriate.

The trunking 16 may be made from flexible plastics tube although, alternatively, it may be made from corrugated metal tube or a rigid tubular material. The electrical or telecommunication leads 9,11 are metal sheathed to prevent electromagnetic interference of the telecommunications signals by current flowing in the electrical leads. Alternatively, the main trunking may contain secondary metal trunking in order physically, as well as electrically, to separate the electrical and telecommunication leads.

The service outlet units and their leads 9,11 are preferably preassembled which means that the required outlet sockets are assembled in the housing and fully wired up and are provided with trunking and leads of appropriate length to enable connection to electrical junction boxes and telecommunication services, on site, in a factory. Additionally or alternatively standard fibre optic connectors can be incorporated in the housing unit and fibre optic cables can be incorporated in the trunking in the same way as electrical leads.

While particular embodiments have been described, it will be understood that modifications can be made without departing from the scope of the invention as defined by the appended claims. For example, access slots or other openings 8 may be formed in more than one edge of a removable panel 4 and, if desired, in all its edges, and/or an edge may be formed with more than one such slot 14. Moreover, to facilitate connection of the leads 9 of the service outlet unit 7 to a junction box 6 or other connection device located in the underfloor space 5, suitable plug and socket connections may be used for this purpose.

I claim:

1. An access floor construction having an access floor formed from removable panels supported on a subfloor to form an underfloor space accommodating at least one service supply which includes at least one distribution device disposed in the underfloor space, at least one of the removable panels forming the access floor having at least one access opening in at least one edge thereof, characterized by at least one service outlet disposed above floor level and having at least one associated lead connected to an adjacent distribution device in the underfloor space via said at least one access opening, the said at least one lead of the service outlet being encased in trunking from the service outlet to said at least one access opening.

2. An access floor construction as claimed in claim 1, characterized in that the service outlet comprises at least one electrical outlet and at least one telecommunication outlet and the trunking includes means separating a telecommunication lead associated with said at least one telecommunication outlet from an electrical lead associated with said at least one electrical outlet and electrically shielding said telecommunication lead from said electrical lead.

3. An access floor construction as claimed in claim 1, characterized in that said at least one lead is connectable to the distribution device by means of plug and socket connectors.

4. An access floor construction as claimed in claim 1, characterized in that said at least one service supply includes a plurality of said distribution devices disposed throughout the underfloor space, preferably, in a regular array, and a plurality of said floor panels having said access openings in their edges are distributed throughout the access floor, whereby to permit the associated leads of a plurality of said service outlets disposed above floor level at spaced locations to be connected to adjacent ones of said distribution devices.

5. An access floor construction as claimed in claim 4, characterized in that unused ones of said access openings in the floor panels are closed by means of suitable plugs.

* * * * *